United States Patent
Han et al.

(10) Patent No.: US 6,725,828 B1
(45) Date of Patent: Apr. 27, 2004

(54) VORTEX-INDUCED STRATIFICATION COMBUSTION FOR DIRECT INJECTION SPARK IGNITION ENGINES

(75) Inventors: Zhiyu Han, Plymouth, MI (US); Claudia Olivia Iyer, Canton, MI (US); Ruben Humberto Munoz Pascua, Ann Arbor, MI (US); Brad Alan VanDerWege, Dearborn, MI (US); Jianwen James Yi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/462,282

(22) Filed: Jun. 17, 2003

(51) Int. Cl.$^7$ ................................. F02B 17/00
(52) U.S. Cl. .................. 123/295; 123/305; 123/285
(58) Field of Search .................. 123/295, 305, 123/279, 285

(56) References Cited

U.S. PATENT DOCUMENTS

| | | | | |
|---|---|---|---|---|
| 1,696,799 | A | * 12/1928 | Held | ............ 123/256 |
| 5,215,052 | A | * 6/1993 | Augustin | ............ 123/276 |
| 5,660,156 | A | * 8/1997 | Whitacre et al. | ............ 123/279 |
| 5,720,253 | A | 2/1998 | Matoba et al. | |
| 5,727,520 | A | 3/1998 | Wirth et al. | |
| 5,785,028 | A | 7/1998 | Anderson et al. | |
| 5,921,215 | A | 7/1999 | Wirth et al. | |
| 5,941,207 | A | 8/1999 | Anderson et al. | |
| 5,943,993 | A | 8/1999 | Carstensen et al. | |
| 5,960,767 | A | 10/1999 | Akimoto et al. | |
| 6,158,409 | A | 12/2000 | Gillespie et al. | |
| 6,269,790 | B1 | 8/2001 | Yi et al. | |
| 6,286,477 | B1 | 9/2001 | Yang et al. | |
| 6,334,427 | B1 | 1/2002 | Nakayama et al. | |
| 6,386,175 | B2 | 5/2002 | Yang | |
| 6,443,122 | B1 | 9/2002 | Denbratt et al. | |
| 6,499,457 | B2 | * 12/2002 | Suzuki et al. | ............ 123/295 |

OTHER PUBLICATIONS

U.S. patent application No. 10/318,844 Filed Dec. 16, 2002, titled "Spark–ignition Engine Having Direct Fuel Injection", Martin Wirth (which claims priority under 35 USC 119 to EP 01129782.7 filed Dec. 14, 2001 with specification in German).

\* cited by examiner

Primary Examiner—Bibhu Mohanty

(57) ABSTRACT

A system and method for controlling combustion in a direct injection spark ignition internal combustion engine inject fuel directly into a combustion chamber in a wide-angle, hollow-cone spray to form a vortex that draws fuel vapor out of the spray to form a combustible fuel-air mixture at a spark location outside the hollow-cone spray. Various piston combustion bowl configurations further enhance the stability of the vortex and reduce fuel impingement on the piston surface while providing a desired compression ratio. Cylinder airflow is controlled to produce substantial swirl flow resulting in a more compact fuel cloud around the spark location to reduce over-mixing and improve robustness to cycle-to-cycle variation in the mixing process.

33 Claims, 6 Drawing Sheets

VORTEX-INDUCED STRATIFICATION COMBUSTION FOR DIRECT INJECTION SPARK IGNITION ENGINES

BACKGROUND OF THE INVENTION

1. Field of the Invention

The present invention relates to a system and method for controlling combustion in stratified charge direct-injection spark-ignition internal-combustion engines.

2. Background Art

Stratified-charge direct-injection spark-ignition (DISI) internal combustion engines have been developed to reduce fuel consumption of gasoline engines, but could have even lower fuel consumption if inefficiencies due to incomplete combustion and/or poor combustion phasing could be reduced. Incomplete combustion is usually due to the inability to repeatedly mix the fuel with an appropriate amount of air in the vicinity of the spark plug resulting in under-mixing or over-mixing of the fuel with the air. Undermixed and overmixed regions increase fuel consumption as well as hydrocarbon and carbon monoxide feedgas emissions. Poor combustion phasing results from timing the spark to occur when the appropriate air/fuel mixture is present at the spark plug, rather than at the optimal time in the cycle.

At least two primary design strategies have emerged to control the fuel injection and spark timing for direct injection stratified-charge (DISC) engines: wall-guided and spray-guided combustion systems.

Wall-guided combustion systems generally use a relatively narrow swirl-type fuel injector in combination with a piston bowl to redirect the fuel spray toward the spark plug. To avoid excessive spray impingement on the piston surface at high back pressures (i.e., high pressure in the combustion chamber), and to allow the fuel enough time to rebound from the piston to the spark location, these systems require relatively early injection timing. The long fuel path of wall-guided systems from a side-mounted injector, down to the piston bowl, and back up to the spark plug provides ample opportunity for over-mixing, resulting in less of the fuel being burned. In addition, during operation in stratified-charge mode, a significant amount of fuel may impinge on the piston surface leading to smoke and hydrocarbon (HC) emissions. To improve combustion stability at light load operation (approximately less than 2 bar BMEP), the intake may need to be throttled to reduce air induction, resulting in increased pumping losses and reduced efficiency.

Spray-guided combustion systems primarily use the fuel spray momentum to form the fuel-air mixture. They typically have a close-coupled injector and spark plug. These systems typically require very close timing of the spark and fuel injection, leaving only a small window near the end of injection for firing of the spark plug, which limits control flexibility and provides little time for the fuel droplets to evaporate. This can lead to burning of the droplets and very fuel-rich mixtures, resulting in smoke emissions.

SUMMARY OF THE INVENTION

The present invention overcomes various shortcomings of the previous wall-guided and spray-guided combustion systems and balances combustion completeness and combustion phasing while controlling smoke emissions through proper positioning of the spark gap relative to a vortex-induced stratified charge (VISC). The invention also includes piston crown designs and in-cylinder flow control to further improve the efficiency, improve combustion stability, and reduce emissions for a direct-injection stratified-charge internal-combustion engine.

Embodiments of the present invention include a system and method for controlling combustion in a direct injection internal combustion engine that injects fuel directly into a combustion chamber with a wide-angle, hollow-cone spray. The spray momentum forms a vortex that draws fuel vapor out of the spray toward a spark location outside the cone spray to form a combustible fuel-air mixture before the spray impinges on the piston.

To further enhance the stability of the vortex and reduce fuel impingement on the piston while providing a desired compression ratio, the piston crown includes a combustion bowl defined by a raised rim forming an outer periphery of a spark recess or cavity and an anti-spark recess or cavity. The inner peripheries of the cavities are defined by a protrusion generally centered within the hollow-cone spray. In one embodiment, the protrusion is generally linear and extends across the bowl to separate the cavities. In another embodiment, the protrusion is generally dome-shaped.

The rim or outer periphery of the combustion bowl is raised higher around the spark cavity to increase squish flow and enhance the vortex structure. The radius of the spark cavity is selected to envelop the lower portion of the vortex. The cavities preferably are shaped to provide corresponding fuel impingement surfaces substantially equidistant from the fuel injector. In one embodiment, the anti-spark cavity has a larger radius with a lower rim and greater depth than that of the spark cavity to provide substantially equidistant surfaces relative to a centrally located injector inclined slightly from vertical toward the intake ports.

The invention also includes controlling in-cylinder airflow to create primarily swirl flow to further enhance formation of the fuel cloud and mixing of the fuel and air. In one embodiment, the in-cylinder airflow is controlled by at least partially restricting airflow through at least one intake port, which can be accomplished by closing a swirl control valve (SCV) that blocks one of the intake ports in a system having dual intake ports, for example.

The present invention provides a number of advantages. In general, the present invention provides a better tradeoff between combustion completeness and combustion phasing, while controlling smoke emissions by forming and controlling a suitable vortex from the injected fuel spray to induce charge stratification at an appropriate position relative to the spark gap. The piston crown designs and in-cylinder flow control of the present invention help to stabilize the vortex and reduce penetration so that the fuel-air mixture remains around the spark plug for a longer period of time. This expands the ignition timing window to provide greater control flexibility. Because the fuel spray does not need to be reflected from the piston geometry as in the wall-guided systems, smoke emissions are reduced and the fuel can be injected later in the cycle to provide better combustion phasing and improved thermal efficiency. The later injection timing afforded by the present invention also facilitates more complete burning of the hydrocarbons to improve combustion efficiency. The vortex-induced charge stratification produces a more confined stratified charge, which allows stable operation at low loads without inlet throttling, thereby reducing pumping losses and improving efficiency.

The above advantages and other advantages, objects, and features of the present invention will be readily apparent from the following detailed description of the preferred embodiments when taken in connection with the accompanying drawings.

DETAILED DESCRIPTION OF THE PREFERRED EMBODIMENT(S)

Figure 1:
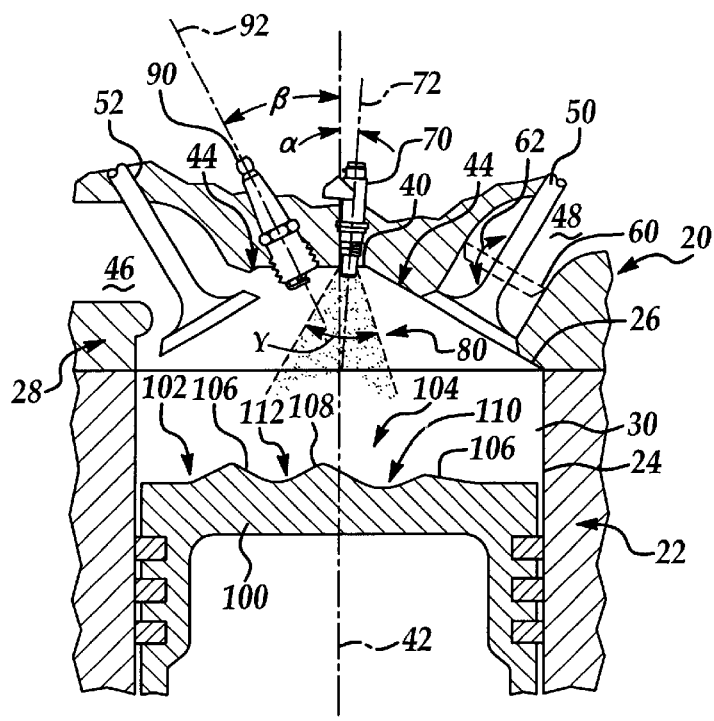
FIG. 1 is a cross-section illustrating one embodiment of vortex induced stratification combustion according to the present invention.

FIG. 1 is a cross-section of a representative cylinder/combustion chamber of a multiple cylinder direct-injection stratified charge internal combustion engine illustrating one embodiment of vortex induced stratification combustion according to the present invention. Engine 20 includes an engine block 22 having a plurality of cylinder bores 24 that cooperate with corresponding pent-roof cylinder caps 26 of cylinder head 28 to form combustion chambers 30. Pent-roof cylinder caps 26 include a top portion 40 that is generally perpendicular or normal to the longitudinal axis 42 of cylinder bore 24. Top portion 40 is connected to two opposing ramp portions 44 that accommodate exhaust ports 46 and intake ports 48. As will be appreciated by those of ordinary skill in the art, although one preferred embodiment includes two intake ports and two exhaust ports per cylinder (only one of each being shown in FIG. 1), the present invention may be used with engine configurations having one or more intake ports and/or one or more exhaust ports.

Each combustion chamber 30 includes an intake valve 50 for each intake port and an exhaust valve 52 for each exhaust port. Intake valve 50 selectively couples combustion chamber 30 to an associated intake manifold (not shown). Similarly, exhaust valve 52 selectively couples combustion chamber 30 to an associated exhaust manifold (not shown). Of course, the intake manifold and/or exhaust manifold may be integrally formed within cylinder head 26, or may be separate components depending upon the particular application. Intake valves 50 and exhaust valves 52 may be operated using any of a number of known strategies including a conventional camshaft arrangement, variable camshaft timing and/or variable lift arrangements, or using electromagnetic valve actuators, for example.

One or more intake ports 48 for each combustion chamber 30 may include a swirl control or charge motion control valve 60 that is controlled to selectively block at least a portion of the air inducted into combustion chamber 30 to generate primarily swirl flow with some tumble and cross-tumble (helical) flows, as described in greater detail below. In one preferred embodiment, each combustion chamber 30 includes two intake ports 48 with one intake port having a swirl control valve 60 selectively moveable as generally indicated by arrow 62 in response to a corresponding control signal from the engine controller to substantially completely block the associated intake port during the intake stroke to minimize tumble and induce substantially all swirl flow within combustion chamber 30.

Each combustion chamber 30 includes an associated fuel injector 70 that may extend through top portion 50 of pent-roof cylinder cap 26. The longitudinal axis of the injected fuel spray cone, which may be coincident with the longitudinal axis 72 of the injector, forms an angle alpha ($\forall$) relative to cylinder longitudinal axis 42. As illustrated, fuel injector 70 and its associated spray cone is substantially vertical (for in-line cylinder applications) or substantially coaxial relative to cylinder axis 42. Depending upon the particular application, the fuel spray cone axis may or may not be coincident with the longitudinal axis 72 of the injector, i.e. some injectors create a spray offset from the injector axis. The spray cone axis angle should be less than about fifteen degrees (15°) and is preferably zero.

In response to a corresponding fuel injection signal generated by the engine controller, fuel injector 70 sprays fuel, indicated generally by reference numeral 80, directly into combustion chamber 30 in a wide-angle hollow cone having a cone angle represented by gamma (()). A hollow cone having a cone angle between about eighty and one hundred degrees (80°–100°), and preferably about ninety degrees (90°) formed from individual fuel droplets having an average diameter of less than about 20 micrometers is used to provide low penetration at high pressures. The average droplet size may be specified using any of a number of measures, such as the Sauter Mean Diameter (SMD), for example. If the cone angle (gamma) is too narrow, induced air flows may cause the spray cone 80 to narrow at higher ambient pressures. If the droplets are too large, fuel spray cone 80 may not evaporate quickly enough and it may not entrain sufficient air to produce a strong vortex and limit penetration.

As also illustrated in FIG. 1, each combustion chamber 30 includes an ignition source, such as a spark plug 90, that extends through cylinder roof 26 and is close-coupled with fuel injector 70. Spark plug 90 preferably extends through top portion 40 of roof 26 and is disposed with its longitudinal axis 92 forming an angle beta ($\exists$) relative to cylinder axis 42. In one embodiment, angle beta is about nine degrees (9°) with spark plug 90 inclined toward exhaust ports 46. However, the angle beta does not have a significant impact on the performance of the present invention. As best illustrated in FIG. 2, spark plug 90 is positioned with its spark location outside hollow cone fuel spray 80 but within a recirculation zone of the vortex formed by the momentum of the fuel spray to initiate combustion within combustion chamber 30 in response to a corresponding ignition timing signal from the engine controller.

A piston 100 is disposed for reciprocating movement within each cylinder bore 24. Piston 100 includes a top portion or crown 102 having a combustion bowl, indicated generally by reference numeral 104. Combustion bowl 104 is defined generally by a raised rim 106 that forms an outer periphery. Combustion bowl 104 includes a protrusion or protuberance 108 that is generally offset from cylinder axis 42, but generally centered within hollow cone fuel spray 80. Protrusion 108 defines or forms an inner periphery of an anti-spark recess or cavity 110 and a spark recess or cavity 112. In one embodiment, protrusion 108 extends generally linearly across combustion bowl 104 (best shown in FIG. 8). In another embodiment, protrusion 108 is generally dome-shaped (best shown in FIG. 11). Fuel droplets reaching the piston surface, also referred to as piston wetting, contribute to soot formation within combustion chamber 30. Recesses 110 and 112 facilitate a reduction in piston wetting and the resulting soot formation by delaying the fuel spray impingement time allowing more of the droplets to evaporate and mix with air before reaching the piston surface. First recess 110 is preferably deeper than second recess 112 based on the angle of inclination (alpha) of fuel injector 70.

As explained in greater detail with reference to FIGS. 9–14, cavity 112 is shaped to envelop a lower portion of the vortex created by fuel spray 80 to improve the stability of the vortex and increase the amount of time a combustible mixture is present at the spark location of spark plug 90. The contour of cavity 112 preferably includes a radius based on an average radius of the vortex, which is smaller than, or similar to, the radius of recess 110. The raised rim 106 may be raised higher around recess 112 than around recess 110 to increase squish flow, which also adds to the vortex flow pattern and enhances stability. Protrusion 108 of combustion bowl 104 reduces the overall volume of combustion chamber 30 to help provide the desired compression ratio with a similar stroke as a substantially flat piston.

Figure 2:
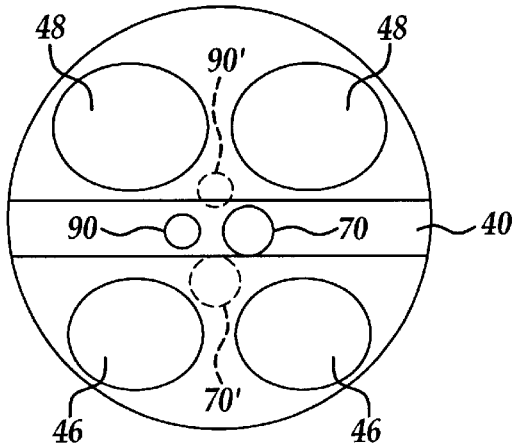
FIG. 2 is a top view schematic of two possible alternative embodiments illustrating relative positioning of an injector and ignition source according to the present invention.

FIG. 2 is a top view schematic of two possible alternative embodiments illustrating relative positioning of injector 70 and ignition source 90 according to the present invention. In both embodiments represented by the schematic of FIG. 2, ignition source 70 and fuel injector 90 are close-coupled and centrally located relative to exhaust ports 46 and intake ports 48. In one embodiment, the transverse axes of spark plug 70 and fuel injector 90 are positioned generally parallel to the transverse axes of exhaust ports 46 and intake ports 48. In another embodiment, the transverse axes of ignition source 70' and fuel injector 90' are positioned generally perpendicular to the transverse axes of exhaust ports 46 and intake ports 48. Those of ordinary skill in the art may recognize other alternative arrangements for positioning of the fuel injector and ignition source based on the teachings of the present invention.

Figure 3:
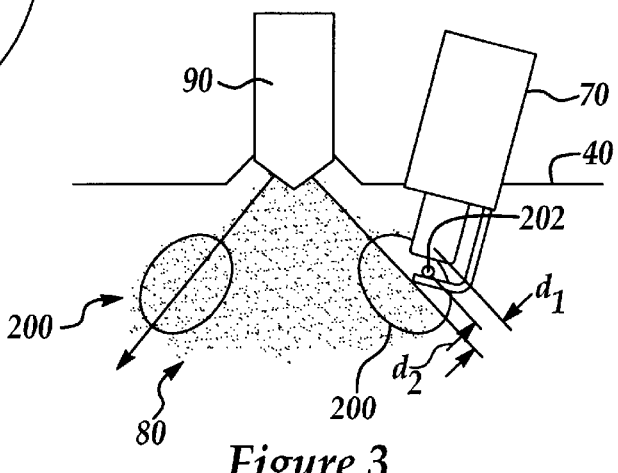
FIG. 3 is an enlarged schematic illustrating positioning of a spark plug outside the fuel spray but within a recirculation zone of a vortex according to the present invention.
Figure 4A:
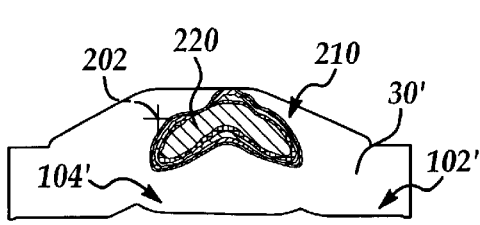
FIGS. 4A–4D are computer simulation generated air/fuel ratio contours illustrating vortex induced stratification corresponding to 45, 40, 30, and 20 degrees before top dead center (BTDC), respectively, according to the present invention.
Figure 4B:
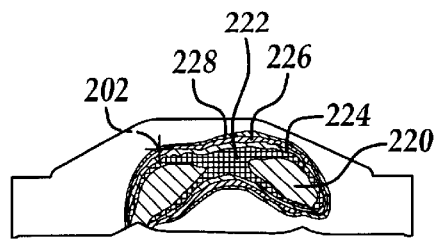
Figure 4C:
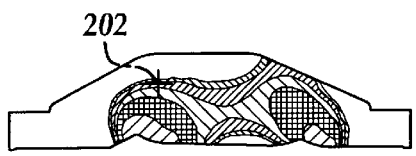
Figure 4D:
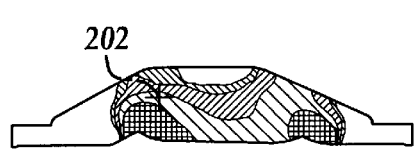

FIG. 3 is an enlarged schematic illustrating positioning of a spark plug and fuel injector with the spark location outside the fuel spray but within a recirculation zone of a vortex according to the present invention. As described above with reference to FIG. 1, the injector in the present invention injects fuel directly into the combustion chamber generating a wide-angle hollow cone fuel spray 80 of small fuel droplets. The momentum of fuel droplets within fuel spray 80 creates a vortex that draws fuel vapor away from fuel spray 80 into recirculation zones 200, which extend a distance d1 outside fuel spray 80. Because wetting of spark plug 70 with fuel may cause corrosion and fouling, spark plug 70 is positioned at a distance d2 with spark location 202 outside of fuel spray 80 but within recirculation zone 200 so that it is within an ignitable portion of the stratified fuel cloud without wetting from fuel droplets. In one embodiment, spark location 202 is positioned a distance d2 of about zero to three millimeters (0–3 mm), preferably about two millimeters (2 mm) outside nominal cone of fuel spray 80 and within a recirculation zone 200 that extends a distance d1 of about four millimeters (4 mm).

A wide angle hollow cone fuel spray with small droplets is used to form a suitable vortex to induce stratification that provides a combustible mixture to the spark location according to the present invention. If the cone angle is too narrow, induced air flows may cause the spray cone to narrow at higher ambient pressures. If the fuel droplets are too large, the spray will not evaporate quickly enough, and it will not entrain sufficient air to produce a strong vortex and limit penetration. For the vortex to form correctly, the normal air entrainment of the spray should be unobstructed, and the spray should be allowed sufficient penetration without hitting a surface as determined by the operating conditions and fuel injector design. In one embodiment, a minimum penetration of about twenty millimeters (20 mm) without hitting a surface is sufficient.

FIGS. 4A–4D are computer predicted air/fuel ratio contours illustrating vortex induced stratification corresponding to 45, 40, 30, and 20 degrees before top dead center (BTDC), respectively, of a conventional piston surface 102' with conventional combustion bowl 104' within combustion chamber 30' taken in a plane passing through the spark plug and fuel injector axes according to the present invention. The air/fuel ratio contours are predicted for an engine speed of 1500 rpm and load of 2.62 bar BMEP. Air/fuel ratio contours, indicated generally by reference numeral 210 illustrate how the spray vortex affects the stratification of the mixture with a combustible mixture formed around spark location 202. Contours 210 include a contour 220 representing an air/fuel ratio of less than 10, a contour 222 representing an air/fuel ratio of about 10–15, a contour 224 representing an air/fuel ratio of about 15–20, a contour 226 representing an air/fuel ratio of about 20–25, and a contour 228 representing an air/fuel ratio of about 25–30.

FIGS. 5A–5D illustrate computer predicted fuel spray patterns and airflow velocities for one embodiment of the present invention corresponding to piston positions of FIGS. 4A–4D, respectively. The predicted fuel spray patterns correspond to an engine speed of 1500 rpm and load of 2.62 bar BMEP. As illustrated by the gas velocity vectors indicated generally by reference numeral 240 in FIG. 5A, at 45 degrees BTDC, the momentum of fuel droplets 80 has already formed a strong outside vortex 242 that draws the fuel vapor out of the spray cone into the recirculation zone of the vortex. The spray-guided strategy of the present invention uses the vortex as the primary means of transporting the combustible mixture to spark location 202 without any interaction from the piston surface, in contrast to many of the wall-guided and spray-guided prior art implementations. FIGS. 5A–5D, in combination with the air/fuel contours of FIGS. 4A–4D show how vortex 242 induces stratification with a combustible mixture formed around spark location 202 while the majority of the spray passes below. Vortex 242 draws fuel vapor outward from spray cone 80 and upstream, providing an ignitable mixture region not aligned with the bulk of the fuel spray.

Figure 6A:
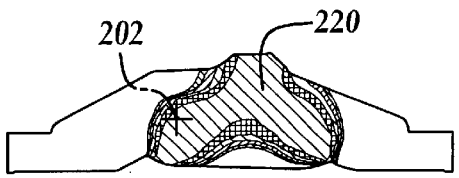
FIGS. 6A–6C and 7A–7C are computer simulation generated air/fuel ratio contours illustrating the effect of generating primarily swirl flow within the combustion chamber according to the present invention.
Figure 6B:
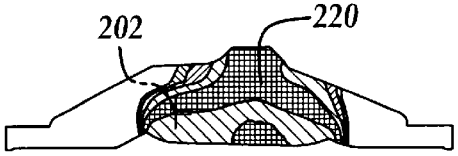
Figure 6C:
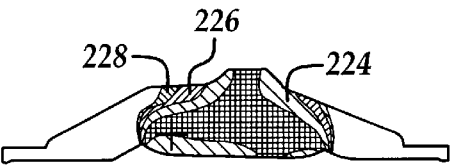
Figure 7A:
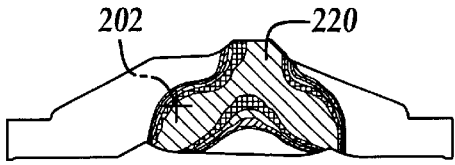
Figure 7B:
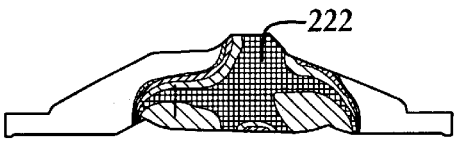
Figure 7C:
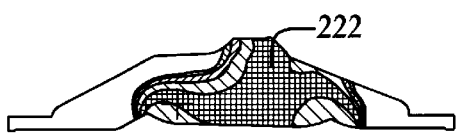

FIGS. 6A–6C and 7A–7C are computer predicted air/fuel ratio contours illustrating the effect of controlling in-cylinder airflow to generate primarily swirl flow within the combustion chamber according to the present invention. The predicted contours of these figures correspond to an engine speed of 2000 rpm and load of 2.0 bar BMEP. The present inventors determined that in-cylinder airflow is a significant factor in the development of the vortex induced stratified charge. Different in-cylinder airflows were tested by varying the angle of a swirl control valve (SCV), which restricts the flow through one of the two intake ports. With the SCV open, the in-cylinder flow is nearly a pure tumble and results in the air/fuel ratio contours illustrated in FIGS. 7A–7C corresponding to crank angles of 690, 700, and 708 degrees, respectively. As the SCV valve is closed, significant swirl flow is introduced resulting in the contours shown in FIGS. 6A–6C corresponding to crank angles of 690, 700, and 708 degrees, respectively. For the illustrated embodiment, testing indicated that the best results were achieved with the SCV fully closed. As illustrated in FIGS. 6A–6C, the fuel cloud is more compact and higher around spark location 202 with the SCV closed than with the SCV open as shown in FIGS. 7A–7C. The more compact shape should reduce over-mixing, while improving robustness to cycle-to-cycle variation in the mixing process. Because the vortex induced stratification combustion of the present invention can produce a stable mixture cloud at a relatively late timing, it provides flexibility to improve combustion phasing without the significant penalty of incomplete combustion that is typically seen in stratified charge engines. As such, use of vortex induced stratification combustion according to the present invention should enable significant gains in fuel economy and substantial reduction in feedgas emissions.

Figure 5A:
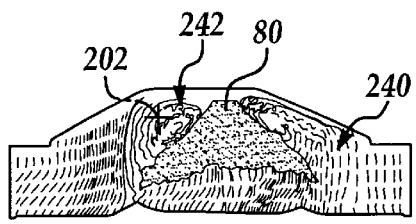
FIGS. 5A–5D illustrate fuel spray and airflow velocity based on a computer simulation for one embodiment of the present invention corresponding to FIGS. 4A–4D, respectively.
Figure 5B:
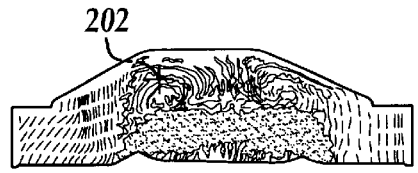
Figure 5C:
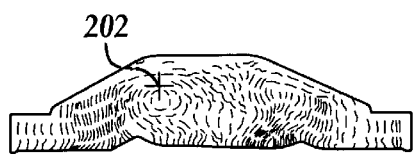
Figure 5D:
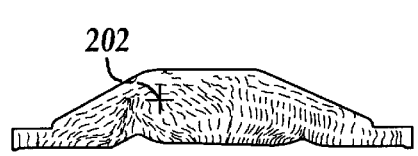

In typical spray-guided implementations, without any way to slow down the penetration of the spray, the spray can quickly convect past the spark location, providing only a narrow window near the end of injection for spark timing. With the fuel spray in the vortex induced stratified combustion of the present invention, the vortex converts much of the spray energy into its rotation, slowing penetration. However, without support, the vortex quickly weakens and dissipates. For example, as shown in FIGS. 5A–5D, the strong vortex 242 formed by spray 80 in FIG. 5A weakens and dissipates relatively quickly as shown in FIGS. 5C and 5D. The present inventors recognized that a complementary piston crown design could be used to support and maintain the vortex for a longer period of time. By stabilizing the fuel vortex, the fuel mixture is more repeatable from cycle-to-cycle and the spark can be initiated as many as ten or more crank angle degrees after the end of injection event, greatly enhancing the flexibility and robustness of the engine calibration. The use of the wider separation between injection and spark timing also helps to reduce soot formation and smoke emissions.

Figure 8:
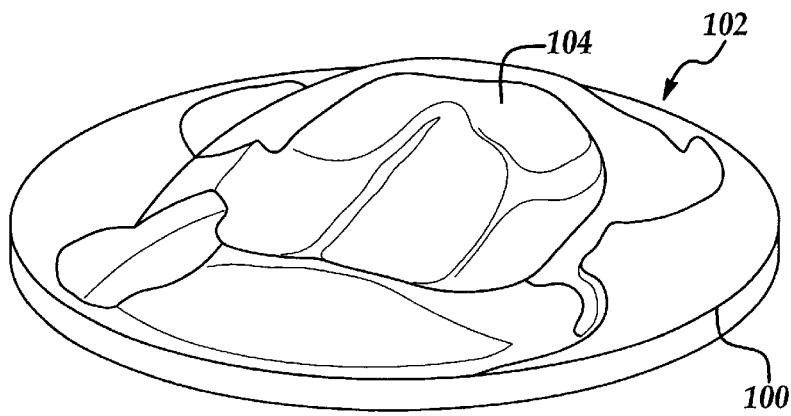
FIG. 8 is a perspective view of one embodiment of a piston crown having a linear protrusion splitting the combustion bowl according to the present invention.
Figure 9A:
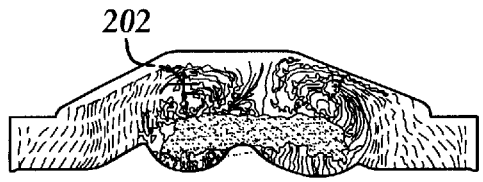
FIGS. 9A–9D are computer generated flow vectors illustrating vortex formation for the combustion bowl of the piston illustrated in FIG. 8.
Figure 9B:
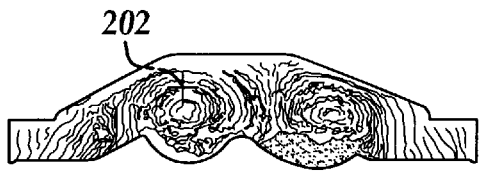
Figure 9C:
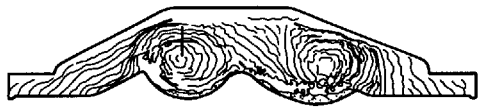
Figure 9D:
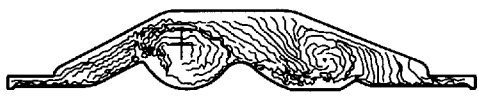

FIG. 8 is a perspective view of one embodiment of a piston crown for use in a vortex induced stratified combustion system according to the present invention. The part of the piston crown below the spray is designed to capture all or part of the fuel vortex to hold it near the spark plug. In this embodiment, piston 100 includes a crown 102 having a combustion bowl 104 defined by a raised rim 106 extending around its outer periphery. A generally linear protrusion 108 extends across combustion bowl 104 to separate a first recess 110 from a second recess 112. Raised rim 106 is raised higher around recess 112 to create squish flows that blow tangentially to the vortex within the combustion chamber to enhance its rotational velocity. Recess 110 is generally deeper than recess 112 to delay fuel impingement time as described above. Likewise, recess 112 is shaped with a radius generally corresponding to an average radius of the vortex to envelop the lower portion of the vortex and support the vortex structure.

FIGS. 9A–9D are computer predicted velocity vectors illustrating the fuel spray pattern and vortex formation for a split-bowl piston with a linear protrusion dividing the bowl as illustrated in FIG. 8. The predicted velocity vectors correspond to an engine speed of 1500 rpm and a load of 2.62 bar BMEP. FIGS. 9A–9D represent a central cross-section with spark location 202 in the middle of the squish region corresponding to piston positions of 45, 40, 30, and 20 degrees BTDC, respectively. As shown in FIGS. 9A–9D, the split-bowl piston design includes an exhaust recess (left side) shaped so that the spray induced vortex structure can be held stably inside the left bowl for a longer period of time as compared to the conventional combustion bowl design as illustrated in FIGS. 5A–5D. The raised rim around the outer periphery of the exhaust recess increases the squish flow to add to the vortex flow pattern and enhance the vortex structure, which can be clearly seen at 20 degrees BTDC in FIG. 9C. In the conventional piston design (FIG. 5C), the vortex structure is almost dissipated by this time. However, the vortex structure is well preserved at the same time for the split-bowl piston crown design illustrated in FIG. 8.

Figure 10:
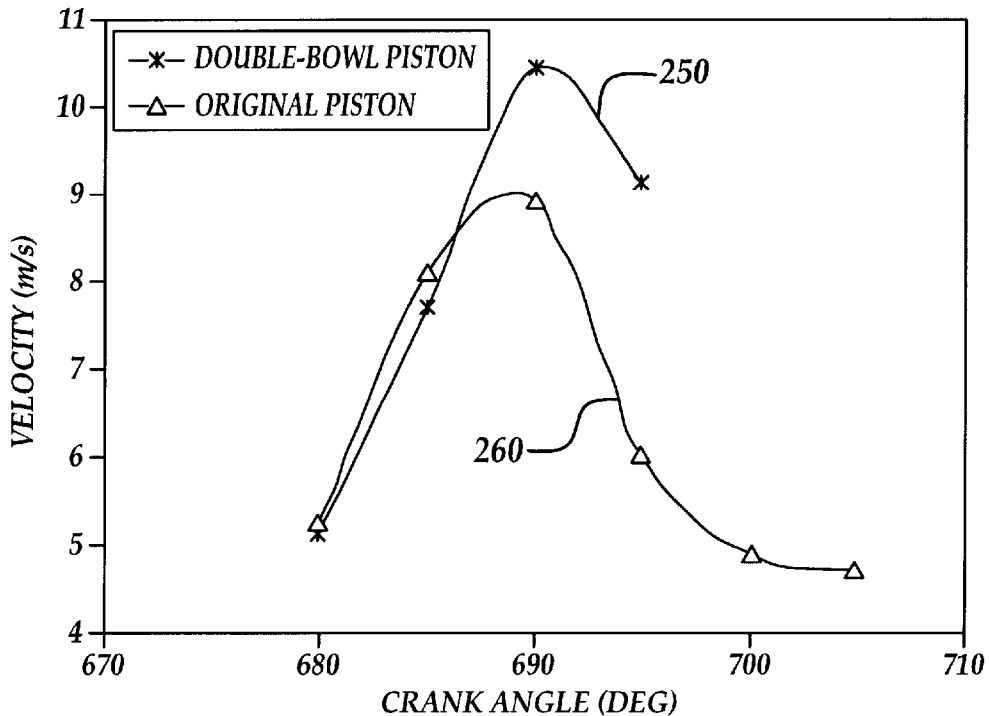
FIG. 10 is a graph illustrating an increase in peak vortex flow velocity for the piston combustion bowl illustrated in FIG. 8 relative to a baseline piston with conventional combustion bowl, as predicted by a computer simulation.

FIG. 10 is a graph illustrating an increase in computer-predicted peak vortex flow velocity for the split-bowl piston illustrated in FIGS. 8–9 relative to a baseline piston having a conventional combustion bowl, both corresponding to an engine speed of 1500 rpm and load of 2.62 bar BMEP. Curve 250 represents the velocity at a location 1 mm below the bottom plane of the cylinder head for the split-bowl design, while curve 260 represents the velocity at the same point for a conventional combustion bowl. In FIG. 10, 720 crank angle degrees corresponds to the top dead center of the compression stroke. The higher velocity represented by curve 250 of the split-bowl design facilitates air/fuel mixture recirculation around the spark plug, which improves the combustion stability. In addition, the protrusion separating the combustion bowl recesses divides the fuel spray into two parts. The first branch generates the desired stratified mixture around the spark plug for stable ignition and combustion, while the second branch has a deeper cavity to reduce piston wetting for engine smoke reduction. The position of the splitter is offset relative to the cylinder axis in such a way that the amount of fuel separated on the first side is sufficient for ignition at lightest load stratified-charge operation. Once the load increases, the separated fuel amount will be approximately the same and the produced stable combustion robustness function is insensitive to the increased fuel amount.

The piston bowl recesses defined by the raised rim and protrusion of the bowl shape delay the fuel spray impingement time, increase the time for the fuel spray to evaporate before it reaches the piston surface, and increase the time for mixing. Predicted soot formation of the split-bowl piston design shows that the split-bowl design reduces soot emissions by about 25% or more.

Figure 11:
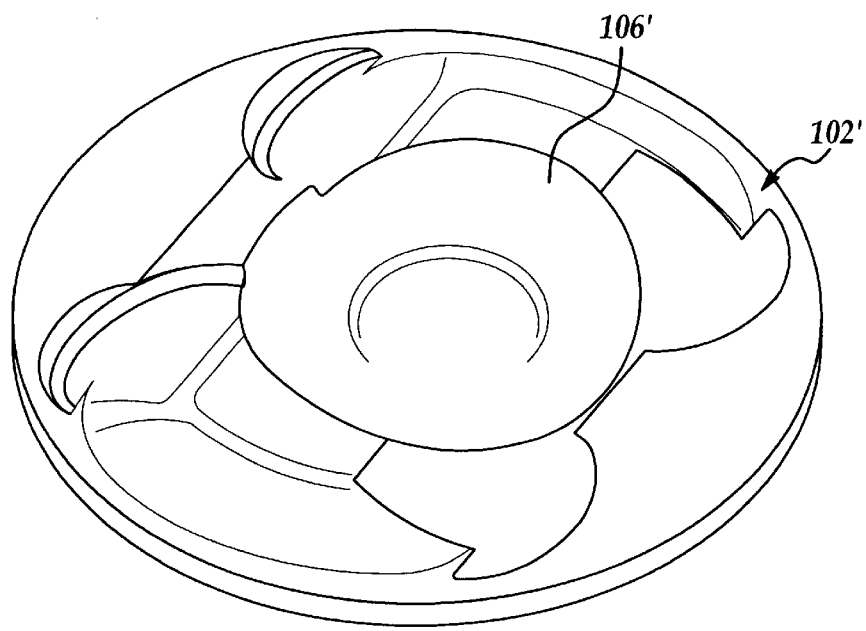
FIG. 11 is a perspective view of another embodiment of a piston crown having a dome-shaped protrusion within the combustion bowl according to the present invention.
Figure 12A:
FIGS. 12A–12C and 13A–13C illustrate improvement in fuel spray patterns for the piston combustion bowl illustrated in FIG. 11 relative to a baseline piston, as predicted by a computer simulation.
Figure 12B:
Figure 12C:
Figure 13A:
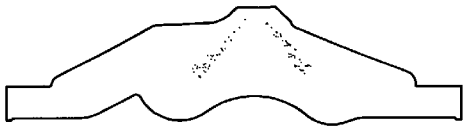
Figure 13B:
Figure 13C:

FIG. 11 is a perspective view of another embodiment of a piston crown design for use in a vortex-induced stratified combustion engine according to the present invention. Similar to the split-bowl design of FIG. 8, the part of the piston crown below the spray is designed to capture all or part of the fuel vortex to hold it near the spark plug. In this embodiment, piston 100' includes a crown 102' having a combustion bowl 104' defined by a raised rim 106' extending around its outer periphery. A generally dome-shaped protrusion 108' separates combustion bowl 104' into a first recess region 110' and a second recess region 112'. Raised rim 106' is raised higher around second recess region 112' to create squish flows that blow tangentially to the vortex within the combustion chamber to enhance rotational velocity of the vortex. The first recess region 110' is generally deeper than the second recess region 112' to delay fuel impingement time as described above. Likewise, the second cavity region 112' is shaped with a radius generally corresponding to an average radius of the vortex to envelop the lower portion of the vortex and support the vortex structure.

FIGS. 12A–12C and 13A–13C illustrate the computer-predicted fuel spray patterns for the piston combustion bowl for an engine speed of 1500 rpm and load of 2.62 bar BMEP according to the present invention illustrated in FIG. 11 relative to a baseline piston having a conventional combustion bowl. FIGS. 12A–12C and 13A–13C correspond to crank angle degrees of 692, 696, and 700, respectively, with the end of injection event occurring at 692 crank angle degrees. It can be seen that the piston crown design of FIG. 11 is similar to the split-bowl design of FIG. 8 and also facilitates reduction of soot emissions by delaying fuel impingement time and reducing piston wetting. The predicted reduction in soot formation is about 25% or more.

Figure 14:
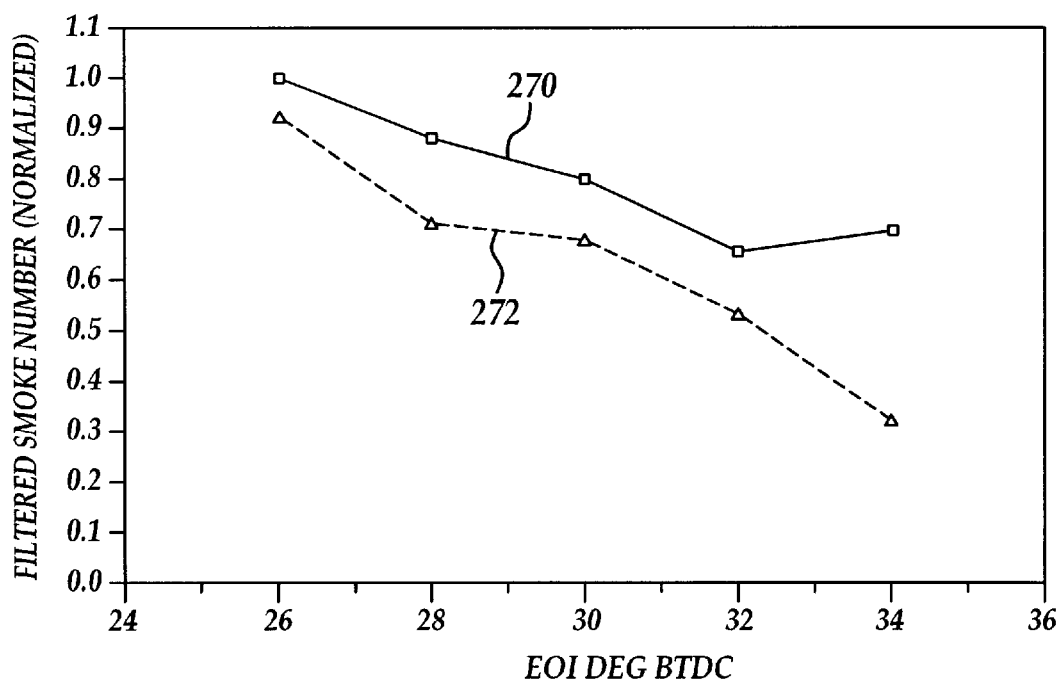
FIG. 14 is a graph illustrating reduction of soot formation for the piston combustion bowl of FIG. 11 relative to a baseline piston.

FIG. 14 is a graph illustrating reduction of soot formation for the piston combustion bowl of FIG. 11 as represented by line 272 relative to a baseline piston as represented by line 270. The graph illustrates a reduction in the normalized Filtered Smoke Number (FSN) as a function of the End of Injection (EOI) as measured in degrees before top-dead-center (BTDC) at 1750 rpm and 4.0 bar BMEP for stratified charge operation. The graph illustrates a significant reduction in soot emissions over a wide range of injection timings.

As such, the present invention utilizes the vortex produced by a hollow cone fuel spray to induce superior stratification over a wide range of operating conditions. The in-cylinder air flow control in combination with improved piston crown designs cooperate to improve the robustness of the mixing process to cycle-to-cycle variation, which may result in reduced emissions and increased fuel economy.

While the best mode for carrying out the invention has been described in detail, those familiar with the art to which this invention relates will recognize various alternative designs and embodiments for practicing the invention as defined by the following claims.

What is claimed:

1. A method for controlling combustion in a direct-injection internal combustion engine having a plurality of cylinders each having an intake port, an exhaust port, an ignition source, a fuel injector, and a piston, the method comprising:

injecting fuel from the fuel injector directly into a cylinder to form a hollow cone fuel spray, the hollow cone fuel spray creating a vortex that draws fuel vapor away from the fuel spray toward a spark location outside of the fuel spray to form a stratified fuel-air mixture;

enveloping a lower portion of the vortex within a combustion bowl of the piston defined by a raised rim forming an outer periphery of first and second recesses and an inner periphery defined by a protuberance generally centered within the hollow cone fuel spray to improve stability of the vortex and increase time that a combustible mixture is present at the spark location; and generating a spark from the ignition source at the spark location within a recirculation zone of the vortex to initiate combustion.

2. The method of claim 1 wherein the protuberance extends generally linearly across the combustion bowl to separate the first and second recesses.

3. The method of claim 1 wherein the protuberance is generally dome-shaped.

4. The method of claim 1 wherein the step of injecting fuel comprises injecting fuel to form a wide angle hollow cone fuel spray to reduce penetration.

5. The method of claim 4 wherein the wide angle hollow cone forms a cone angle of between about eighty to one hundred degrees.

6. The method of claim 1 wherein a longitudinal axis of the hollow cone fuel spray is less than about fifteen degrees relative to a longitudinal axis of the cylinder.

7. The method of claim 1 wherein the fuel spray contains fuel droplets with a Sauter Mean Diameter (SMD) of less than about 20 micrometers.

8. The method of claim 1 further comprising positioning the spark location within about zero to three millimeters outside the hollow cone fuel spray.

9. The method of claim 8 wherein the spark location is positioned about two millimeters outside the hollow cone fuel spray.

10. The method of claim 1 further comprising generating substantial swirl flow within the cylinder.

11. The method of claim 10 wherein each cylinder includes at least two intake ports and wherein the step of generating substantial swirl flow comprises at least partially blocking one of the intake ports.

12. The method of claim 1 wherein the step of injecting fuel comprises providing a predetermined penetration for the fuel spray without impinging on a surface to facilitate formation of the vortex and vaporization of the fuel.

13. The method of claim 12 wherein the predetermined penetration is at least about 20 millimeters.

14. The method of claim 1 further comprising enveloping a lower portion of the vortex to improve stability of the vortex and increase time that a combustible mixture is present at the spark location.

15. A direct-injection stratified charge internal combustion engine having a plurality of combustion chambers within an engine block and cylinder head, the combustion chambers including at least one intake port and at least one exhaust port, the engine comprising:

a fuel injector associated with each combustion chamber, the fuel injector injecting fuel directly into the associated combustion chamber in a hollow cone fuel spray to create a vortex that draws fuel vapor away from the fuel spray to form a stratified fuel-air mixture;

an ignition source positioned within each combustion chamber outside of the hollow cone fuel spray within a recirculation zone of the vortex; and a piston within each combustion chamber, the piston including a combustion bowl defined by a raised rim forming an outer periphery of first and second recesses and an inner periphery defined by a protuberance generally centered within the hollow cone fuel spray.

16. The engine of claim 15 wherein the piston protuberance extends generally linearly across the combustion bowl to separate the first and second recesses.

17. The engine of claim 15 wherein the piston protuberance is generally dome-shaped.

18. The engine of claim 15 wherein the first recess is deeper than the second recess.

19. The engine of claim 15 wherein the piston combustion bowl rim is raised higher around the second recess than around the first recess.

20. The engine of claim 15 wherein the second recess has a contour that envelops a lower portion of the vortex.

21. The engine of claim 20 wherein the second recess has a radius generally corresponding to an average radius of the vortex.

22. The engine of claim 15 wherein the first and second recesses are shaped to provide corresponding fuel impingement surfaces for the hollow cone fuel spray that are substantially equidistant from the fuel injector.

23. The engine of claim 15 wherein the fuel injector and ignition source are closely coupled and centrally located relative to the intake and exhaust port or ports.

24. The engine of claim 15 wherein a longitudinal axis of the hollow cone fuel spray is less than about fifteen degrees relative to a longitudinal axis of the combustion chamber.

25. The engine of claim 24 wherein the longitudinal axis of the hollow cone fuel spray is coincident with a longitudinal axis of the fuel injector.

26. The engine of claim 15 wherein the ignition source is positioned about two millimeters outside the hollow cone fuel spray.

27. The engine of claim 15 wherein air inducted through the at least one intake port is partially blocked to generate primarily swirl flow within the combustion chamber.

28. The engine of claim 15 wherein the at least one intake port includes two intake ports, the engine further comprising:

a valve positioned near the intake ports to selectively block at least a portion of air inducted through one of the intake ports to generate swirl flow within the combustion chamber.

29. A direct injection stratified charge internal combustion engine comprising:

a cylinder block having a plurality of cylinder bores each having a longitudinal axis;

a cylinder head attached to the cylinder block and having a plurality of pent-roof cylinder caps with a top portion generally normal to the longitudinal axis of the cylinder bore connected to two opposing ramp portions accommodating at least two exhaust ports and at least two intake ports, the intake ports coupling the combustion chamber to an intake manifold via associated intake valves and an associated swirl control valve for selectively blocking at least a portion of one of the intake ports for each combustion chamber to induce in-cylinder swirl flow;

a plurality of fuel injectors each extending through the top portion of an associated pent-roof combustion chamber, each fuel injector injecting fuel directly into the associated combustion chamber in a wide-angle, hollow-cone spray whose momentum forms a vortex that draws fuel vapor out of the spray into a vortex recirculation zone to form a stratified fuel-air mixture;

a plurality of spark plugs each extending through the top portion of an associated pent-roof combustion chamber and positioned outside the hollow-cone spray and inside the vortex recirculation zone; and a plurality of pistons disposed within corresponding cylinder bores, each piston having a crown that includes a combustion bowl defined by a raised rim forming an outer periphery of a first recess oriented toward the intake ports and a second recess oriented toward the exhaust ports, the inner periphery of the first and second recesses being defined by a protrusion offset from the longitudinal axis of the cylinder and generally centered within the hollow-cone fuel spray.

30. The engine of claim 29 wherein the piston crown protrusion for each of the plurality of pistons extends generally linearly across the combustion bowl to separate the first and second recesses.

31. The engine of claim 29 wherein the piston crown protrusion for each of the plurality of pistons is generally dome-shaped such that the first and second recesses form a single continuous recess.

32. The engine of claim 29 wherein each piston includes a crown with the first recess having a larger radius and lower rim than the second recess.

33. The engine of claim 29 wherein the piston crown protrusion for each piston is offset toward the exhaust ports relative to the longitudinal axis of the associated cylinder bore.

* * * * *